United States Patent [19]
Goodman et al.

[11] Patent Number: 4,646,300
[45] Date of Patent: Feb. 24, 1987

[54] COMMUNICATIONS METHOD

[75] Inventors: William R. Goodman, Palo Alto; Richard B. Mayfield, Saratoga; Ted Tawshunsky, Cupertino; Fredrick L. Zardiackas, Sunnyvale, all of Calif.

[73] Assignee: Tandem Computers Incorporated, Cupertino, Calif.

[21] Appl. No.: 551,297

[22] Filed: Nov. 14, 1983

[51] Int. Cl.$^4$ .............................................. G06F 11/14
[52] U.S. Cl. ...................................... 371/33; 364/200
[58] Field of Search .................... 371/32, 33; 364/200, 364/900

[56] References Cited

U.S. PATENT DOCUMENTS

| | | | |
|---|---|---|---|
| 3,671,945 | 6/1972 | Maggio, Jr. | 371/32 |
| 3,754,211 | 8/1973 | Rocher et al. | 371/33 |
| 4,304,001 | 12/1981 | Cope | 371/32 X |
| 4,332,027 | 5/1982 | Malcolm et al. | 371/33 X |
| 4,393,501 | 7/1983 | Kellogg et al. | 371/33 |

OTHER PUBLICATIONS

Davies et al., Communication Network for Computers, John Wiley & Sons, London, 1973, pp. 177–236, 382–421.

Primary Examiner—Charles E. Atkinson
Attorney, Agent, or Firm—Lyon & Lyon

[57] ABSTRACT

The present disclosure relates to a communications method for communicating data over a data channel that comprises two unidirectional communication lines. A protocol which is set of predetermined control characters is used by the communications method and the protocol is used for transferring data between communicating devices. The communications method combines acknowledgements which are control characters of the protocol transmitted in between messages, piggybacking which is the combining of control characters of the protocol and data messages, and hold-offs with long time outs which cause the devices to enter a standby idle mode waiting for a responsive control character of the protocol. The communications system and method combines these features so as to permit improved efficient flow control of data information between the communicating devices.

9 Claims, 6 Drawing Figures

FIG_5

FIG. 6

COMMUNICATIONS METHOD

BACKGROUND

The present invention relates to a communications system and method both of which use a pair of communications devices for communicating messages across a data channel.

A protocol which aids the transfer of data is intended to be used to effect delivery to a communicating device that may be executing higher level application programs. The messages transferred between the communication devices include protocol control codes of the protocol and data. The protocol should be transparent to the higher level application programs which rely on the protocol and the communications devices so that unnecessary and excessive communication responsibilities are not that of the higher level application programs. Consequently, many application programs include their own high level protocol programs to effect the proper compilation of multiple messages transferred over the data channel. The data portion of the message includes the higher level protocols and therefore is not a part of the protocol that is used to effect delivery between the communication devices.

The two communications devices which transmit data to each other must account for the nature of their communications channel. Many useful communications channels are error prone, that is, information can be lost or corrupted in the process of data transfer from one device to the other. Other useful qualities of the data channels, such as their extreme speed or their relative inexpensiveness, may prompt the system designer to use them anyway and to provide a mechanism which allows the communicating devices to transfer their data even when the data channel is error prone.

A proper solution to using an error-prone data channel is to provide a protocol for transferring the information within flow restrictions, detecting errors and providing recovery from the errors. There are many such protocols used in the art. The protocols are tailored to a specific set of problems and to a specific data channel.

The degree of error to which the data channel is prone affects the efficiency and effectiveness of the protocol. Most protocols are concerned with data channels that are fairly likely to lose messages or to corrupt data in transit. Efficient use of the high speed capability of the data channel is important because the transfer rate affects the efficiency of a computer system.

Flow control is required during data transfers between communicating devices. Data is lost if the amount of transferred data exceeds the capacity of the receiving communications device thereby degrading the effective transfer rate. Most protocols for high speed data channels assume a predetermined memory capacity.

Acknowledgments are those protocol control codes that are used to signal a transmitting device that the receiving device has received a message. These acknowledgment protocol control codes are well known in the art.

Each particular control code, e.g., acknowledgment, has a specific meaning. Because a control code can have different meanings depending upon the state of the communicating devices, a single meaning control code is inefficient. Multiple meaning control codes can have multiple purposes so as to reduce the number of communications required.

Piggy-backing, which is the combining of protocol control codes and data transferred in a single message, is well known in the art. The use of acknowledgment control codes in combination with data in a message, that is, the data and control codes are piggy-backed, has been used to avoid the transmission of a message merely to effectuate flow control.

To avoid memory capacity over-flow of a receiving device, flow control is necessary. The data flow to a receiving device must be at a rate such that the receiving memory capacity does not overflow and lose data. The use of separate acknowledgment protocol control codes within a message containing only the control code has been used in the prior art to effect flow control. The use of acknowledgment messages without data for the sole purpose of flow control disadvantageously decreases the efficiency of the communicating devices over the data channel because two acknowledgments may be required. One acknowledges receipt of data and a second signals the ability to receive another message. These two messages can be replaced with a single message. This single message has both meanings.

Other types of communicating devices have used hold-off periods for flow control. The transmitting device will hold-off sending a data message until it has received an acknowledgment or has waited for a long time-out period. This time-out period is used to allow the receiving device sufficient time to process the data it has received. The receiving device processes the data thereby emptying its memory capacity so that it can receive additional data. If the acknowledgment is not received at the end of the long time out period, an error condition is recognized. The use of the hold-off period eliminates the need to send the acknowledgment immediately after receipt because no time-out error occurs until after the time-out period. Consequently, the receiving device has until the expiration of the time-out period to acknowledge receipt of a message.

The hold-off with long time-outs, in combination with multiple meaning control codes piggy-backed with data, increases the efficiency of the communicating devices. A receiving device only sends the acknowledgment after it has processed previously received data. This acknowledgment can be piggy-backed with a data message and the acknowledgment can mean that the receiving device received the previously transmitted message and is ready to receive another message. Consequently, there are a minimum number of messages required and this improves the efficiency of the communicating devices.

SUMMARY

It is an object of the present invention to provide an effective and efficient method of transferring data between two communications devices across a data channel which is prone to errors. Another object of the present invention is to provide an effective and efficient method of transferring data within a minimum set of protocol control codes which are transparent to high level application programs that use high level application protocols.

The two communications devices are connected together by the data channel, an electronic link that allows for the transfer of data, in message form, between the two devices. Messages include protocol control codes, which enable the communicating devices to detect communications errors.

The protocol requires that a receiving device acknowledge messages which it receives correctly; in this way, the sender is informed that the message has in fact been received correctly. In addition, acknowledgment is used as a form of flow control, in that the sending device will not transmit a new message until acknowledgment of the current message has been received. If acknowledgment has not been received by the sender within a predetermined timeout period, the original message is retransmitted, and acknowledgment awaited again. Unlike some protocols, which may require both an acknowledgment to tell the sender that the previous message was correctly received, and another message, to tell the sender that the receiver is ready-to-receive once again, this protocol uses a single acknowledgment to accomplish both functions.

Acknowledgments and data may be combined into a single message when possible; this is known as piggybacking, because the acknowledgment "rides piggyback" on the data message. By this means, the number of messages which must be transmitted may be reduced. This is desirable, because the efficiency of the communicating devices and the channel that connects them is improved when fewer messages are required to provide both data transfer and flow control.

The two communicating devices are differentiated into a master device, which controls the data path, and a slave device. The master may initiate data transfer to the slave when it wishes, and thereafter may continue to transfer data taking into account acknowledgments received from the slave. The slave may initiate data transfer to the master only when the master enables this activity by means of a protocol message.

The efficiency of the communication channel is markedly improved when acknowledgment messages are used to effect both acknowledgment of correct receipt and flow control; the efficiency is improved further still by means of piggy-backing acknowledgments on data messages. Efficiency is further improved by using a minimum set of control codes.

Thus, a message sent can mean that the sending device is ready to receive additional information, that it acknowledges the prior transmitted message, and that data is included with the acknowledgment. These and other advantages will become apparent in a description of the preferred embodiment.

PREFERRED EMBODIMENT

Figures 1, 2:
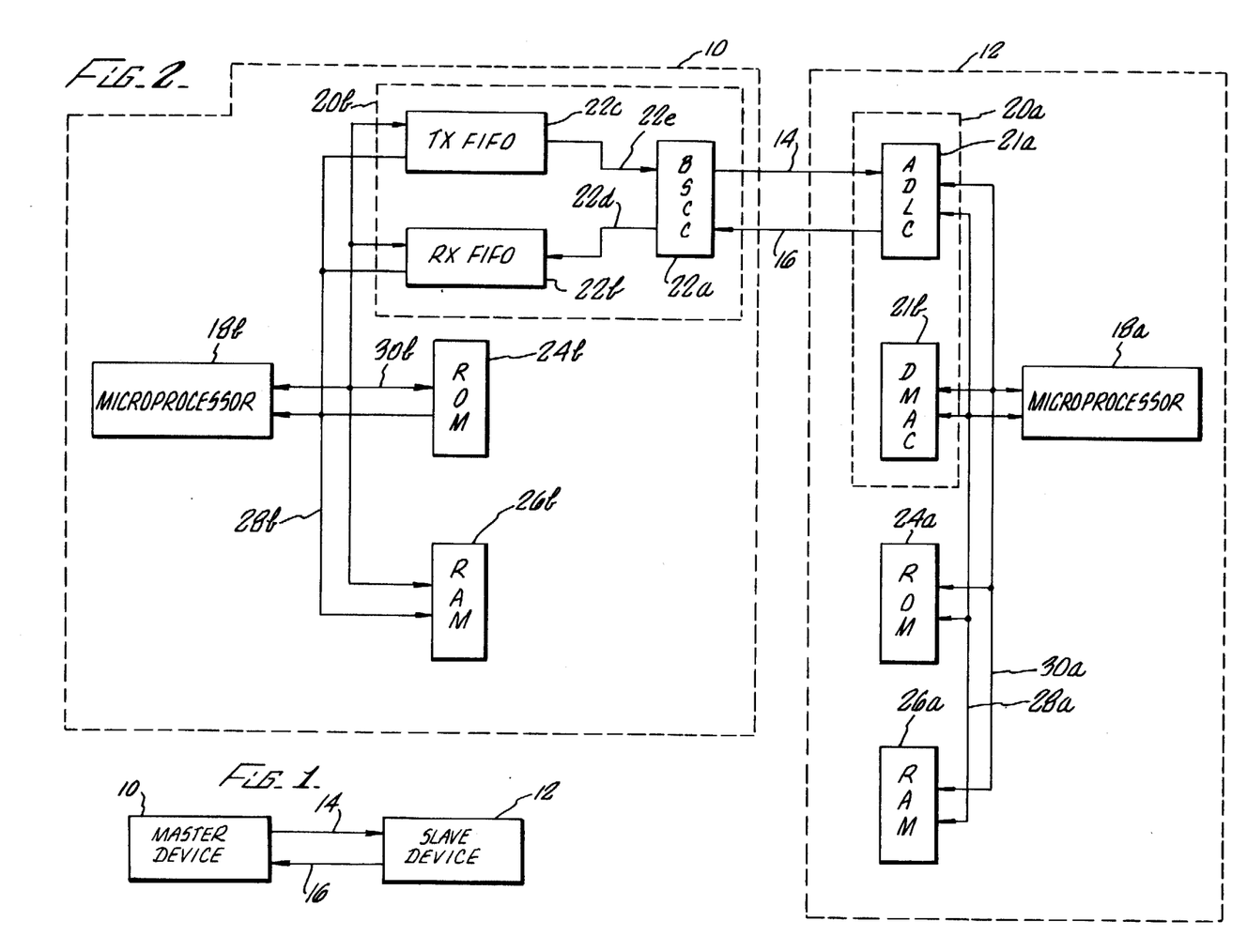
FIG. 1 is a diagram wherein two communicating devices are shown.
FIG. 2 depicts the hardware architecture of the communicating devices.

Referring to FIG. 1, a communication system comprises a master device 10, a slave device 12, and a data channel connecting them, comprised of an output (relative to the master device) link 14, and an input (also relative to the master device) link 16. The data channel allows for data to be transferred between the master device 10 and slave device 12.

Referring to FIG. 2, the master device 10 communicates with the slave device 12 over the output data link 14 and the input data link 16. The architecture of the master device 10 is similar to the slave device 12.

Both the master and slave device have a microprocessor, 18b and 18a respectively, ROM (read-only memory), 24b and 24a respectively, RAM (random-access memory), 26b and 26a, respectively, and ports, 20b and 20a, respectively. The microprocessors 18 execute program code stored in both ROM 24 and RAM 26, and transfer data in and out of RAM 26 through data busses 28 by use of address busses 30.

The port 20a of the slave device 12 comprises an ADLC (Advanced Data Link Controller) 21a and a DMAC (Direct Memory Access Controller) 21b; the port 20b of the master device 10 comprises a BSCC (Bit Synchronous Communications Controller) 22a, an RXFIFO (Receive First-In First-Out) 22b, a TXFIFO (Transmit First-In First Out) 22c, a receive line 22d and a transmit line 22e.

The hardware architecture of the slave device 12 is a conventional one and is well known in the art. The ADLC 21a may be an industry standard Motorola part number 6854, the DMAC 21b may be an industry standard Motorola device part number 6844, the microprocessor 18a may be an industry standard Motorola device part number 6809. The RAM 24a and ROM 26a are also standard conventional components. All of these devices are configured in a conventional manner.

The architecture of the master device 10 is a conventional one. The port 20b of the master device 10 uses the BSCC 22a to communicate data; the TXFIFO 22c and RXFIFO 22b are used for data buffering during transmission and reception, respectively. The BSCC 22a may be an industry standard conventional component 2652. The TXFIFO 22c and RXFIFO 22b comprise conventional discrete components. The microprocessor 18b may be an industry standard Motorola part number 6809. The RAM 24b and ROM 26b are also standard conventional components. All of these devices are configured in a conventional manner.

Figure 3:
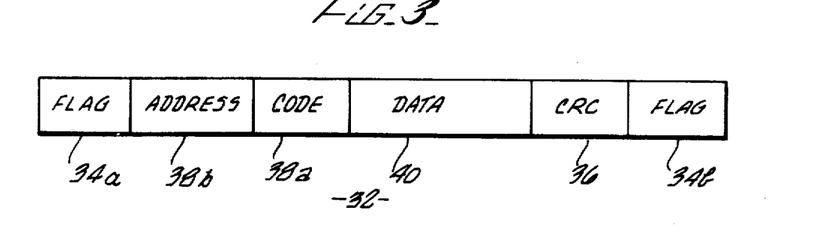
FIG. 3 depicts the format of data within a message.

Referring to FIG. 3, a message 32 of data is encoded into a predetermined format including flag fields 34a and 34b which mark the beginning and end of the message 32. A CRC (cyclic redundancy check) 36 is generated by a polynomial as is well known in the art; the CRC 36 is used for error detection. The address 38b is the address of the slave device 12 which is to receive the master device's 10 message, or of the slave device which is sending the message. The code 38a contains the control codes of the protocol. The data field 40 contains data being transferred between communicating devices 10 and 12, and may include high level application data. High level applications do not process the code 38a, consequently these protocol codes 38a are transparent, i.e., invisible, to high level application programs.

Referring to FIG. 2 and FIG. 3, the address 38b, code 38a and data 40 are transferred through the BSCC 22a for the master device 10 or the ADLC 21a for the slave device 12. When transmitting, the BSCC 22a or ADLC 21a, for master device 10 or slave device 12 respectively, is responsible for generating the leading flag 34a, CRC 36 and trailing flag 34b. When receiving, the BSCC 22a or ADLC 21a, for master device 10 or slave device 12 respectively, is responsible for detecting the leading flag 34a, CRC 36 and trailing flag 34b. This technique of generation and recognition is well known in the art.

Figure 4:
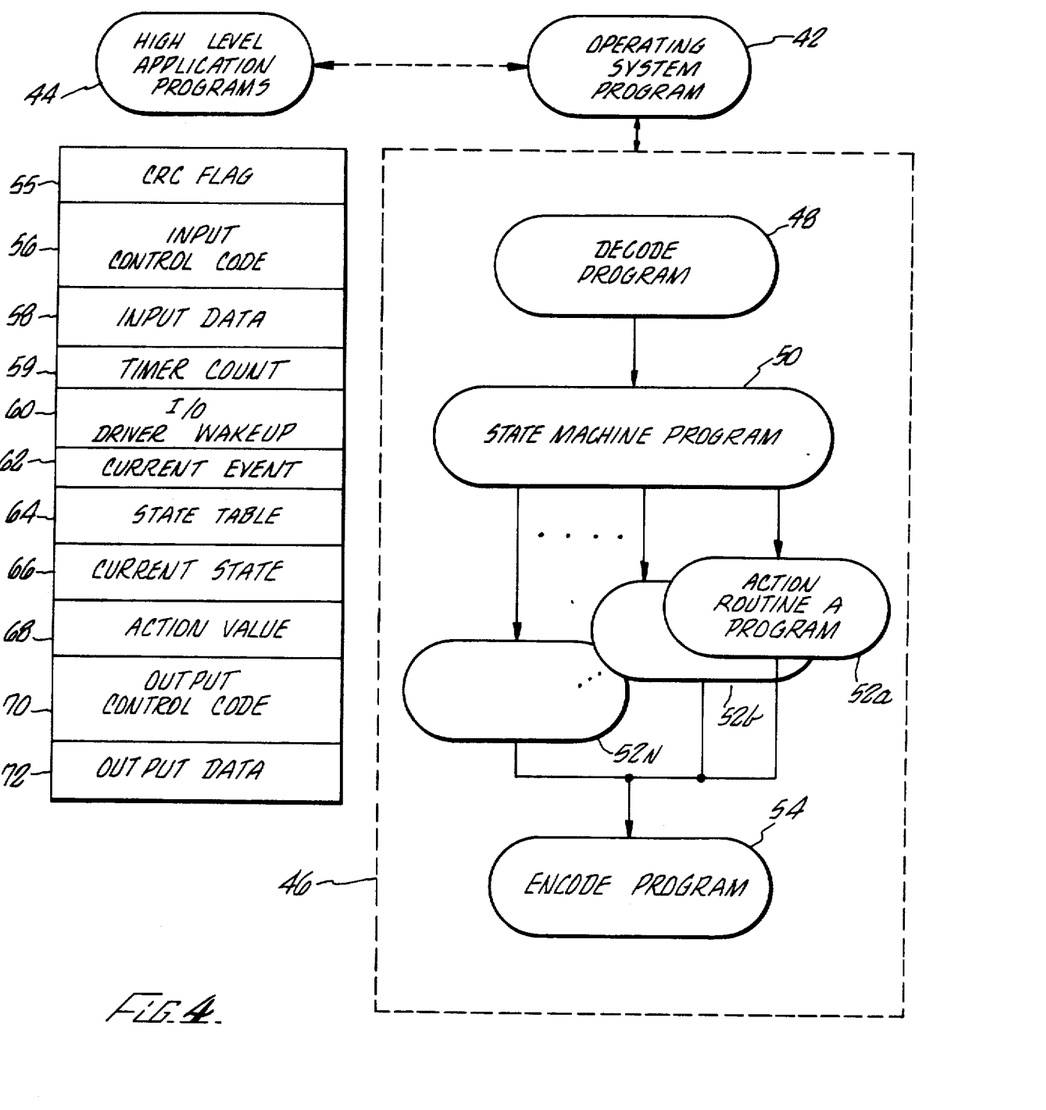
FIG. 4 is a flow diagram with memory elements used during the transfer of data of a communicating device.

Referring to FIG. 2 and FIG. 4, the RAM 26 and ROM 24 are used to store an operating system program 42, high level application programs 44 and an I/O (input/output) driver program 46. The I/O driver program 46 works in conjunction with the operating system program 42 to implement the present communications method.

The operating system program 42 controls the transfer of data between the RAM 26 and the port 20 of the devices. In particular, in the slave device 12, the operating system program 42 enables the DMAC 21b to automatically transfer data to or from the RAM 26a from or to the ADLC 21a in a manner well known in the art. The data which is either read from or written to the RAM 26a comprises the address 38b, the code 38a and the data 40.

In the case of the master device 10, the operating system program 42 enables the transfer of data between the port 20b and the microprocessor 18b, and then the microprocessor 18b and the RAM 26b in a two-step process. In more detail, when data is being received by the master device 10 on link 16, data is routed through BSCC 22a, through receive line 22d, through temporary RXFIFO buffer 22b into the microprocessor 18b by the use of data bus 28b, and then out of the microprocessor 18b by use of the data bus 28b to the RAM 26b where it is stored. When data is being transmitted by the master device 10 over link 14, data is transferred from the RAM 26b by use of the data bus 28b, into the microprocessor 18b, and then from the microprocessor 18b by use of the data bus 28b through the temporary TXFIFO buffer 22c, through transmit line 22e and through the BSCC 22a onto link 14.

It should now become apparent that the operating system programs 42 are different in the master device 10 and the slave device 12 due to the differences in the hardware implementation of the two devices. It should also be apparent that the ports 20 are used to transfer data to or from the RAM 26, the principal difference between the master device 10 and the slave device 12 being the mode of transfer between ports 20 and RAM 26.

The high level application programs 44 are programs that perform "user" tasks, i.e., functions that make use of the communications method herein described, but which are not directly a part of that method. On the other hand, the operating system programs 42 and the I/O driver programs 46 provide the mechanism for the execution of, and communications between, high level application programs 44 executed in the master device 10 and slave device 12.

For example, suppose that a high level application program 44 in the master device 10 requires transfer of data from itself to a high level application program 44 in the slave device 12. In this instance, the high level application program 44 in the master device 10 readies the data, the operating system program 42 causes the I/O driver program 46 to be executed, which causes the data to be transferred through interaction with the operating system program 42. In a sense, the I/O driver program may be considered an extension of the operating system program 42. The operating system program 42 and the I/O driver program 46 in a particular device are used in common by one or more high level application programs 44 in that device.

The I/O driver program 46 comprises a decode program 48, a state machine program 50, a plurality of action routine programs 52a, 52b through 52n, and an encode program 54.

In a sense, the state machine program 50 is the "heart" of the I/O driver program. The function of the state machine, when invoked, is to "map" the current state and the current event into an action and a new current state. The current event is stored in the current event segment 62 and the current state is stored in the current state segment 66. The state table segment 64 contains, in effect, a table of tables. The current state segment 66 "selects" one of those tables, and the current event segment 62 "selects" an entry within that table. Each entry contains an action value, which is stored in the action value segment 68, and a next state value which replaces the current state segment 66. Next, the action value segment 68 is used to select and execute one of the action routine programs 52. The state machine program 50 in device 10 or 12 operates consistently with a state table stored in state table segment 64; the state table is one of the two represented in FIG. 5 and FIG. 6 for the master device 10 and the slave device 12, respectively. Since the state diagrams are different, it is clear that the communication method of the present invention is asymmetrical.

The function of the decode program 48 is to determine the current event, store it into the current event segment 62 and invoke the state machine program 50. The I/O driver program 46, and in particular, the decode program 48 is invoked by the operating system program 42 when a message 32 has been received, a transfer request has been made by a high level application program 44, or a timeout has occurred.

When a message 32 has been received, the operating system program 42 sets the code 38a and the data 40 into the input control code segment 56 and the input data segment 58 respectively; the operating system program 42 also stores a value into the CRC flag segment 55, indicating whether or not the message was received without error within the constraints of the CRC polynomial used by both the ADLC 21a and the BSCC 22a. Finally, the operating system program invokes the I/O driver program 46 after setting the I/O driver wakeup segment 60 to a value indicating that a message has been received. The decode program then examines the CRC flag segment 55; if the CRC flag segment 56 indicates that the message was received with error, the input control code segment 56 and the input data segment 58 are cleared, i.e., the message is discarded, and the state machine program is not invoked. If the message was received without error, the decode program 48 places a value into the current event segment 62 in accordance with the input control code segment 56 value, and then invokes the state machine program 50.

When a high level application program 44 makes a transfer request, the operating system program 42 invokes the I/O driver program 46 after setting the I/O driver wakeup segment 60 to a value indicating that a message is to be sent. In this case, the decode program 48 determines if the current state segment 66 indicates that a high level application program request may be processed at this time, that is, in the current state; if not, the request is saved for later processing, i.e., the decode program 48 does not place a value into the current event segment 62 and the state machine program 50 is not invoked. Otherwise, the decode program 48 places a value into the current event segment 62 indicating that there is a high level application program 44 request to be processed, and invokes the state machine program 50. The action routine programs 52 which are invoked by the state machine program 50 in these cases will in turn activate the encode program 54 which causes the output control code segment 70 to be set in accordance with the type of message to be sent, and the output data segment 72 to the message data 40 to be transferred. Then the encode program 54 will cause the operating system program 42 to initiate the actual transfer to the port 20, which in turn will appropriately append flag characters 34 and CRC 36 as described above.

The operating system program 42 provides timing services for the I/O driver program 46 by use of a hardware "real time clock" as is well known in the art. When the I/O driver is doing a timed operation, it sets a timer count value into the timer count segment 59; each time the clock "ticks", the operating system counts down the value in the timer count segment 59. When the value in the timer count segment 59 reaches 0, the operating system program 42 invokes the I/O driver program after placing a value meaning "timer expired" into the I/O driver wakeup segment 60. In turn, the decode program 48 places a value into the current event segment 62 indicating that the operation timer has expired and invokes the state machine program 50.

Figure 5:
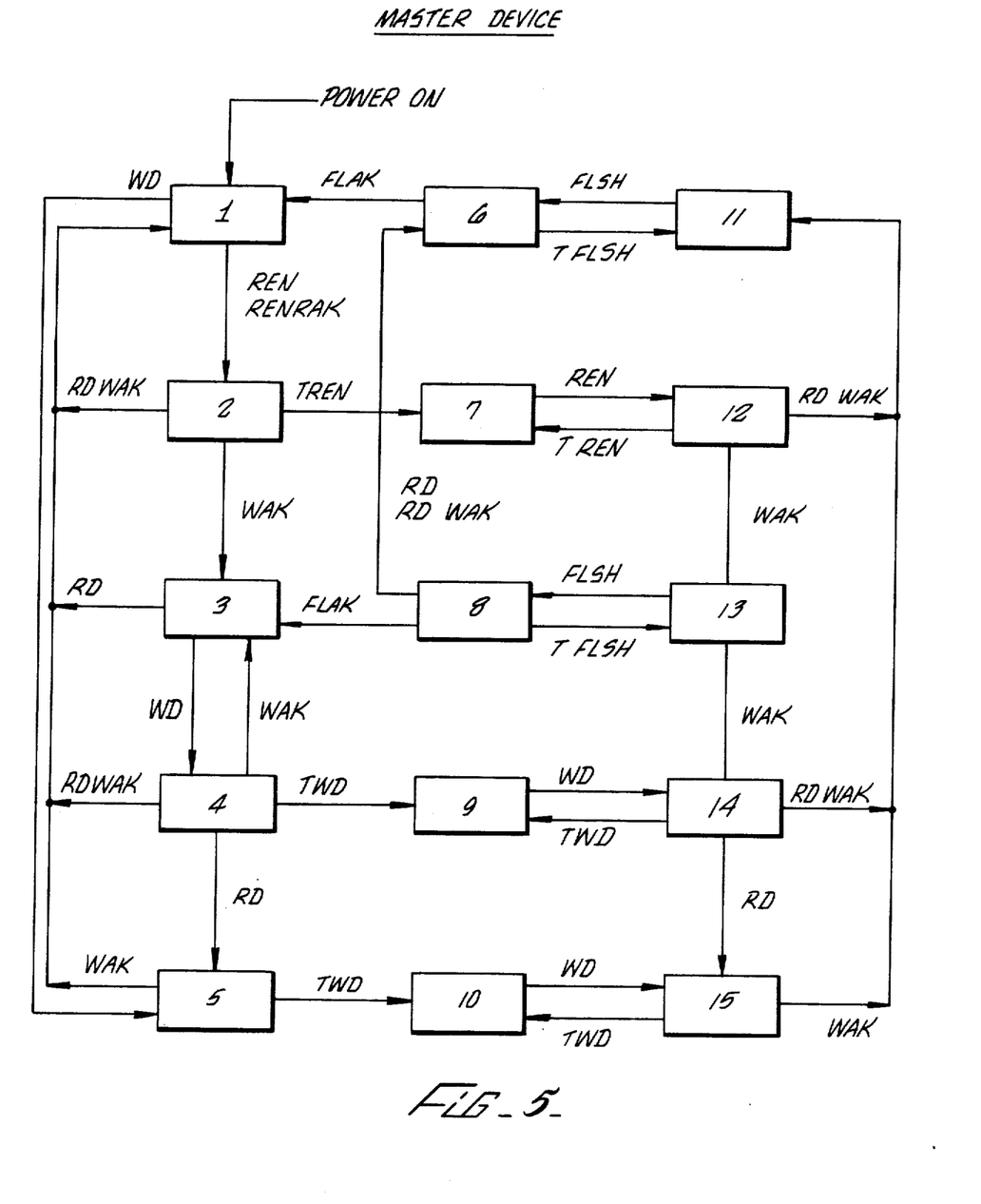
FIG. 5 is a state diagram of the master communicating device.
Figure 6:
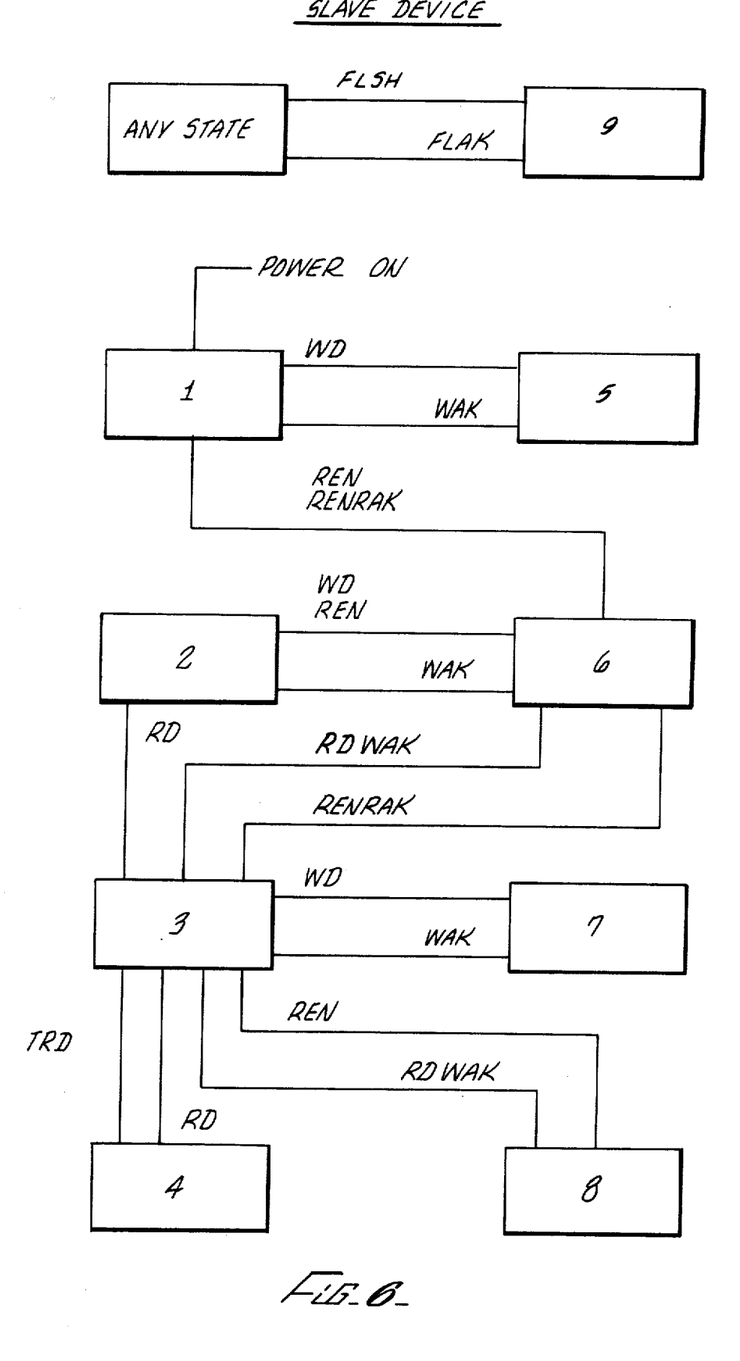
FIG. 6 is a state diagram of a slave communicating device.

The state diagram of the master device 10 is shown in FIG. 5 and the state diagram of the slave device 12 is shown in FIG. 6. Each box in the diagram represents a state; the master device 10 has fifteen states and the slave device 12 has nine states.

A device 10 or 12 transitions from state to state when the device 10 or 12 receives a message, has a message from a high level application program 44 to transfer out or a timer time out occurs. Incoming messages, high level application program requests for transfer and timer time outs cause the operating system program 42 to invoke the I/O driver program 46, and in particular, the decode program 48. The states of each device 10 or 12 represent the states between successive I/O driver program 46 executions.

The present preferred embodiment uses eight protocol codes to guarantee delivery between communicating devices 10 and 12. Messages transferred may be referred to by the code therein. The eight codes are as follows:

The WD (write data) code is used by the master device 10 to transfer data to the slave device 12. The slave device 12, upon receipt, places the code 38a into the input code segment 56 and the data 40 into its input data segment 58. Thereafter, the operating system program 42 transfers the data 40 to a high level application program 44, thereby making the input control code segment 56 and the input data segment 58 available for the next message from the master device 10. Next the slave device 12 acknowledges the message by transmitting either a WAK (write acknowledge) message or a RDWAK (read data write acknowledge) message as described below.

The WAK (write acknowledge) code is used by the slave device 12 to acknowledge the receipt of a WD, REN or RENRAK message. The slave device 12 will only send a WAK message after reading data out of the input data segment 58, so the WAK message also informs the master device 10 that the slave device 12 is ready to receive another message.

The REN (read enable) code is used by the master device 10 to enable the slave device 12 to send data. The master device 10 will only send a REN message when its input data segment 58 is clear.

The RENRAK (read enable read acknowledge) code is used by the master device 10 to enable the slave device 12 to send data and at the same time acknowledge receipt of a prior RD or RDWAK message from the slave device 12. The master device 10 will only send a RENRAK message after it has transferred the data in its input data segment 58 to a high level application program 42.

The RD (read data) code is used by the slave device 12 to transmit data to the master device 10. The slave device 12 may only transmit a RD message when it has been previously enabled by the master device 10 by means of a REN or RENRAK message. The master device 10, upon receipt of the RD message, places the data portion 40 in its input data segment 58. Thereafter, the operating system program 42 of the master device 10 transfers the data 40 to a high level application program 44, thereby making the input data segment 58 available for the next message from the slave device 12. Next, the master device 10 acknowledges the message by transmitting a RENRAK (read enable read acknowledge) message to the slave device 12 to acknowledge receipt of the RD message and enable the slave device 12 to send its next message.

The RDWAK (read data write acknowledge) code combines the effect of the RD and WAK codes. The slave device 12 uses RDWAK message when it must acknowledge a WD, REN or RENRAK message, the slave device 12 has been enabled to transmit the data (as described for RD) and the slave device 12 has data to transfer from a high level application program 44 to the master device 10.

The FLSH (flush) code is transmitted by the master device 10 when resynchronization with the slave device 12 is required; conditions under which this may occur are described later. When the slave device 12 receives a FLSH message, it is supposed to respond with a FLAK (flush acknowledge) message.

The FLAK (flush acknowledge) code is transmitted by the slave device 12 in response to a FLSH message from the master device 10.

Thus, the master device 10 sends WD, REN, RENRAK and FLSH messages; whereas, the slave device 12 sends WAK, RD, RDWAK and FLAK messages.

Each of the REN, RENRAK, WD, FLSH, RD and RDWAK messages expect a response from the receiver of the message. Since messages may be lost or corrupted in an error prone data channel, the arrival of an expected response is timed by the sender of the message. If the response is not received within that time, the message is retransmitted, the timer is restarted, and the response awaited again. The present protocol uses four timers.

Timer TREN (timer read enable) is the amount of time the master device 10 will wait for a WAK message from the slave device 12 in response to a REN or RENRAK message. It should be more than the normal time, including transmission delay, required for the slave device 12 to respond to a REN or RENRAK message. The actual value used for this timer is 0.5 seconds. If the slave device 12 does not respond to the master device 10's REN or RENRAK message with a WAK or RDWAK message within the TREN time, then a TREN time out occurs.

Timer TWD (timer write data) is the amount of time the master device 10 will wait for a WAK message from the slave device 12 in response to a WD message. It should be more than the normal time, including transmission delay, required for the slave device 12 to respond to a WD message. The actual value used for this timer is 0.5 seconds. If the slave device 12 does not respond to WD message of the master device 10 with a WAK or RDWAK message within the TWD time, then a TWD time out occurs.

Timer TRD (timer read data) is the amount of time the slave device 12 will wait for a RENRAK messages from the master device 10 in response to a RD or RDWAK message. It should be more than the normal time, including transmission delay, required for the master device 10 to respond to a RD message. The actual value used for this timer is 3 seconds. If the master device 10 does not respond to a RD or RDWAK message of the slave device 12 with a RENRAK message within the TRD time, then a TRD time out occurs.

Timer TFLSH (timer flush) is the amount of time the master device 10 will wait for a FLAK message from the slave device 10 in response to a FLSH message. It should be more than the normal time, including transmission delay, required for the slave device 12 to respond to a FLSH message. The actual value used for this timer is 0.5 seconds. If the slave device 12 does not respond to a FLSH message of the master device 10 with a FLAK message within the TFLSH time, then a TFLSH time out occurs.

When a timeout occurs, the sending device 10 or 12 will re-transmit the message as originally sent with the following exceptions: a RENRAK message will be re-transmitted as a REN message and a RDWAK message will be retransmitted as a RD message, in other words, a piggy-backed acknowledgment will only be sent once. This is important, because in the event of a timeout, there is uncertainty on the part of the sending device as to the state of the receiving device.

Timeouts may occur due to a number of different causes. The receiving device may be defective, such that it either cannot correctly receive the arriving message or cannot correctly send the response. The data channel may have experienced a transient error condition or it may have failed. Finally, the receiving device may merely be too busy performing its other tasks to respond in a timely manner. Therefore it may be seen that in the case of a timeout condition, there is uncertainty on the part of the sending device as to the state of the receiving device.

The more important cases are described as follows. A sent message may have been corrupted when it arrived at the receiver, in which case the receiver will treat it as not having arrived at all. The receiver may have correctly received the message, but the receiver's response may have been damaged when it arrived at the sender, in which case the sender will treat the response as not having arrived at all, but the receiver will have handled the message normally. Finally, the message and response may have been sent and received properly, except that the response arrives late relative to its associated timer.

To illustrate why piggy-backed acknowledgments are not re-transmitted on a timeout, consider the following. Suppose that the master device 10 sends a RENRAK message to the slave device 12, which correctly receives the RENRAK message and transmits a WAK message, which is then lost. Since the slave device 12 has been enabled to send RD message by the RENRAK message, it may subsequently send a RD message, and in particular, may send it before the master device 10 determines that a TREN timeout has occurred due to the lost WAK message response to the RENRAK message. Further suppose that the RD message is being transferred when the master device 10 determine that the TREN timeout has occurred. It would then send another RENRAK message which would be incorrectly treated by the slave device 12 as acknowledgment to the RD message. Worse, if the RD message was also corrupted, the data associated with the RD message would be lost, because the slave device 12 would believe that the acknowledgment of the master device 10 to the RD message was received, and the slave device 12 would not re-transmit the RD message.

The possibility of late arrival of a response from a slave device 12 may cause the following situation to occur. Suppose that the master device 10 sends a RENRAK message to the slave device 12, which for some reason returns the WAK message response delayed past the TREN time, and the master device 10 therefore retransmits a REN message; the delayed WAK message response to the initial RENRAK message is treated as the response to the re-transmitted REN message by the master device 10. Now suppose that the master device 10 sends a WD message to the slave device 12 before the slave device 12 can send the WAK message to the re-transmitted REN message; in this situation, the WAK message of the slave device 12 which was the intended response to the re-transmitted REN message, will be treated by the master device 10 as an acknowledgment to the WD message instead. Thus, it may be seen that the meaning of a WAK message may be ambiguous in an out-of-synchronization situation such as the one described.

Because the late response situation is indistinguishable at the master device 10 from the situations in which either the message or the response is lost due to an error, the FLSH and FLAK messages are included in the current invention. In the event the master device 10 must re-transmit, when it finally receives a WAK (or RDWAK) message, it will send a FLSH message. All WAK messages received from the slave device 12, between the time the FLSH message is sent and a FLAK message is received from the slave device 12, will be discarded. Since the slave device 12 will generate responses in the order in which it correctly receives messages, once the FLAK message has been received by the master device 10, the master device 10 and slave device 12 are re-synchronized and the master device 10 may once again safely send messages which require WAK (or RDWAK) responses. In the event that a FLSH message must be re-transmitted, and FLAK messages arrive late, i.e., when they are not expected, they are discarded by the master device 10.

If a message 32 is re-transmitted a large number of times without receiving a correct acknowledgment, the sender of the message, either the master device 10 or the slave device 12 will treat the data channel consisting of the links 14 and 16 as failed. The preferred embodiment of the present invention uses five for this large number of times.

The master device 10 uses a state machine of fifteen states as shown in FIG. 5. When power is initially supplied to the device, it starts operation in state 1. The master device 10 will transition through the state diagram in response to messages received from the slave device 12, timeout conditions when awaiting responses, and high level application program 44 requests to initiate WD messages and enable RD messages, until power is lost, or until a link failure condition exists. Link failure will be deemed to have occurred when a large number of retransmissions (as defined above) have been attempted for FLSH messages (states 18, 11 and 13 of FIG. 5), REN messages (state 7 of FIG. 5) or WD messages (states 9 and 10 of FIG. 5).

The slave device 12 uses a state machine of nine states as shown in FIG. 6; note that to simplify the drawing, handling of a FLSH, which may be received in any state from 1 to 8, is shown as a separate part of the diagram. When power is initially supplied to the slave device 12, it starts operation in state 1. In a manner analogous to the master device 10, the slave device 12 will transition through the state table in response to messages received from the master device 10, timeout conditions when awaiting responses, and high level application program 44 requests to initiate RD messages, until it loses power once again, or until a link failure condition exists. Link failure will be deemed to have occurred when a large number of re-transmissions (as defined above) have been attempted for RD messages (state 4 of FIG. 6).

As stated, the master device 10 will follow (transition through) the state diagram of FIG. 5, while the slave device 12 will follow the state diagram of FIG. 6. By this means, communicating devices may ensure the delivery of messages except when either the link (data channel) or one of the devices has failed. An example of part of the communications method is as follows:

Assume that both devices 10 and 12 are in state 1 of their respective state diagrams FIGS. 5 and 6, and the master device 10 sends a WD message and enters state 5 of FIG. 5. The slave device 12 receives the WD message and enters state 5 of FIG. 6. The slave device 12 will send a WAK message and enter state 1 of FIG. 6 when a high level application program 44 has received the data in the WD message. The master device 10 will receive the WAK message and enter state 1 of FIG. 5.

As another example, once again assume that both devices 10 and 12 are in state 1 of their respective state diagrams FIGS. 5 and 6, and the master device 10 sends a RENRAK message and enters state 2 of FIG. 5. The slave device 12 receives the RENRAK message and enters state 6 of FIG. 6. If the slave device 12 does not have data ready to be sent at that time, it will send a WAK message and enter state 2 of FIG. 6. The master device 12 will receive the WAK message and enter state 3 of FIG. 5.

With the slave device 12 in state 2 of FIG. 6 and the master device 10 in state 3 of FIG. 5, the slave device 12 may send a RD message and enter state 3 of FIG. 6; on receipt of the RD message, the master device 10 enters state 1 of FIG. 5.

It should now become apparent that each device transmits four protocol control codes which can be encoded into two bits, and that the entire protocol comprises eight codes. In this manner of sending and receiving messages, the master device 10 and slave device 12 are able to guarantee transfer of messages unless a device 10 or 12 or a link 14 or 16 has failed. It should also now be apparent that this method is both efficient, due to the small set of codes and the piggy-backing capability, and effective, due to the detection and handling of error conditions.

What is claimed is:

1. A communication method for transferring messages over an error-prone channel, comprising the steps of,
communicating between a plurality of master communications devices and a plurality of slave communications devices over a communications link a plurality of messages that may comprise protocol code and data; and each of said messages comprising one of a WD, RD, REN, RENRAK, RDWAK, WAK, FLAK, and FLSH protocol codes,
transmitting four master message from one of said plurality of master communications devices to one of said plurality of slave devices, and each of said four master messages includes one of said WD, REN, RENRAK or FLSH protocol codes, and each of said four master messages has one code that may have multiple meanings, and each of said four master messages may further include data for further processing by said slave communication device,
transmitting four slave messages from one of said plurality of slave communications devices to one of said plurality of said master communications devices, and each of said four slave messages includes one of said RD, RDWAK, WAK and FLAK protocol codes, and each of said four slave messages has one code that may have multiple meanings, and each of said four slave messages may further include data for further processing by said master communications device.

2. A communications method for transferring messages over an error-prone channel, comprising the steps of,
communicating between a plurality of master communications devices and a plurality of slave communications devices over a communications link a plurality of messages that may comprise protocol code and data; and each of said messages comprising one of a WD, RD, REN, RENRAK, RDWAK, WAK, FLAK, and FLSH protocol codes,
transmitting four master messages from one of said plurality of master communications devices to one said plurality of slave devices, and each of said four master messages includes one of said WD, REN, RENRAK or FLSH protocol codes, and each of said four master messages has one code that may have multiple meanings, and each of said four master messages may further include data for further processing by said slave communication device,
transmitting four slave messages from one of said plurality of slave communications devices to one of said plurality of said master communications devices, and each of said four slave messages includes one of said RD, RDWAK, WAK and FLAK protocol, codes, and each of said four slave messages has one code that may have multiple meanings, and each of said four slave messages may further include data for further processing by said master communications device,
re-transmitting by one of said master communications devices a predetermined number of times one of said four master messages until said re-transmitted message is acknowledged by one of said plurality of slave communications devices,
re-transmitting by one of said slave communications devices a predetermined number of times one of said four slave messages until said re-transmitted message is acknowledged by one of said plurality of master communications devices, monitoring respective input memory capacity of each of said plurality of master communications devices and each of said plurality of slave communications devices, acknowledging by one of said plurality of slave communications devices receipt of one of said four master messages only when said input memory capacity is available of said one of said plurality of slave communications devices, delaying re-transmitting said REN message by one of said plurality of master communications device until after a TREN time period unless said WAK or RDWAK message is received by said master communications device, delaying re-transmitting said WD message by one of said plurality of master communications devices until after a TWD time period unless said WAK or RDWAK message is received by said master communications device, delaying re-transmitting said FLSH message by one of said plurality of master communications devices until after a TFLSH time period unless said FLAK message is received by said master communications device, and delaying re-transmitting said RD message by one of said plurality of slave communications devices until after a TRD time period unless said RENRAK message is received by said slave communications device.

3. A method for transferring messages over an error-prone channel, comprising the steps of:

(a) transmitting messages which may comprise protocol codes and data;

(b) retransmitting each said message a predetermined number of times until said message is acknowledged by an acknowledgement code;

(c) monitoring input memory capacity for each device which may receive said message;

(d) delaying said acknowledgement code until said input memory capacity is sufficient to receive a new message; and (e) delaying transmitting said new message until after said acknowledgement code is received.

4. The method of claim 3, further comprising the steps of:

(a) monitoring input remory capacity for each device which may receive said acknowledgement codes;

(b) transmitting an enablement code when said input memory capacity is sufficient to receive a response message;

(c) including said enablement code as part of said message; and (d) including said acknowledgement code as part of said response message when said enablement code has been received.

5. The method of claim 4, further comprising the step of:

(a) delaying retransmitting said message for a predetermined amount of time, unless said acknowledgement code is received.

6. The method of claim 5, wherein said predetermined amount of time (a) is an amount TREN when said message contains an enablement code REN;

(b) is an amount TRD when said message contains both an enablement and acknowledgement code RENRAK; and (c) is an amount TWD when said message contains a data code WD.

7. The method of claim 4, further comprising the steps of:

(a) transmitting a message FLSH to synchronize the protocol state between each device which may send said messages and each device which may receive said messages;

(b) transmitting a message FLAK to acknowledge said message FLSH, whenever said FLSH message is received.

8. The method of claim 7, further comprising the step of:

(a) delaying retransmitting said message FLSH for a predetermined amount of time TFLSH, unless said message FLAK is received.

9. The method of claim 4, wherein said devices are divided into a class of master devices and a class of slave devices; whereby only said master devices may transmit enablement codes.

* * * * *